(12) United States Patent
Haut

(10) Patent No.: US 6,886,261 B2
(45) Date of Patent: May 3, 2005

(54) DRYWALL RIPSAW

(75) Inventor: Dale Steven Haut, New Berlin, WI (US)

(73) Assignee: Dale S. Haut, New Berlin, WI (US)

( * ) Notice: Subject to any disclaimer, the term of this patent is extended or adjusted under 35 U.S.C. 154(b) by 119 days.

(21) Appl. No.: 10/396,249

(22) Filed: Mar. 26, 2003

(65) Prior Publication Data
US 2004/0187320 A1 Sep. 30, 2004

(51) Int. Cl.⁷ .............................. B27B 21/00
(52) U.S. Cl. ............................ 30/502; 30/517; 30/351; 30/355
(58) Field of Search ............ 30/351, 355, 353, 30/502, 517; 7/148, 167; 83/835

(56) References Cited

U.S. PATENT DOCUMENTS

| | | | | |
|---|---|---|---|---|
| 827,426 | A | * | 7/1906 | Daniels ........................ 7/148 |
| 3,837,024 | A | * | 9/1974 | Saunders ...................... 7/144 |
| 6,357,122 | B1 | * | 3/2002 | Bachta ........................ 30/355 |
| 6,401,585 | B1 | * | 6/2002 | Morgan ....................... 83/835 |
| 2002/0112589 | A1 | * | 8/2002 | Lee et al. ..................... 83/835 |

* cited by examiner

Primary Examiner—Douglas D Watts

(57) ABSTRACT

This invention consists of three new features which on their own or in combination, improve the usefulness of the existing drywall jab saw. The three new features are the addition of fine teeth to the top of the blade, a blade with equally spaced holes along its length which are used as a rip guide, and a notch at the end of the handle to help remove narrow rips of drywall.

7 Claims, 2 Drawing Sheets

DRYWALL RIPSAW

CROSS REFERENCE not applicable

STATEMENT OF FEDERALLY SPONSORED RESEARCH not applicable

REFERENCE TO SEQUENCE LISTING not applicable

BACKGROUND OF THE INVENTION

This invention is a hand tool used by the installer of gypsum wallboard (wallboard will be referred to as drywall through out this application.)

My invention adds more functions to the existing common drywall jabsaw. These function do not affect the only function of the existing saw-rough cutting drywall, but will aid in other tasks encountered during the drywall installation process. The addition of these features make this drywall jabsaw a multi-function tool.

SUMMARY OF THE INVENTION

This invention consists of three added features to the single purpose drywall saw. These features will perform the following functions.

Provide a guide used when scoring the face of the drywall.

An aid for breaking off narrow strips after the face has been scored.

A way to smooth out the rough edge of cut or snapped drywall.

DETAILED DESCRIPTION

My invention as described below is the addition of three useful features too the common, single purpose, drywall jab saw.

The saw handle will best be made of a material suitable to withstand the forces exerted on it while being used for its intended purpose. The handle will either be a molded one piece handle or made in two separate halves that would be held together with screws. A 2 piece handle would be able to come apart and an optional handle would be available that would fit thicker drywall.

The saw blade will be made of a hardened steep approx. 1/8" thick.

The handle saw blade will be securely held together.

The improvements and the best mode of using them are as follows:

First a description of the area of drywall installation that this invention pertains to, this will help in understanding the purpose of this invention.

When cutting drywall to a required width to fit the space, it is necessary to score one side of the sheet with a utility knife. Pressure exerted behind the scored surface will cause the sheet to break leaving you with what will be referred to as a rip (a long narrow strip of drywall cut lengthwise.) The professional drywall installer most often accomplishes this by using a standard measuring tape and utility knife. The tape is held in one hand with the tapes blade extended to the desired width, while the other hand holds a utility knife with the hook end of the tape pinched against the blade of the knife. With the tape at a right angle to the sheets edge, it is drawn along the sheet to score the paper surface. This method, though fast and relatively accurate, is more difficult and less accurate when a very narrow rip is required (within 4").

The improvements to the existing drywall saw as outlined in my invention will increase the speed and accuracy of making and removing these narrow rips.

Improvements to the handle and blade.

Figure 7:
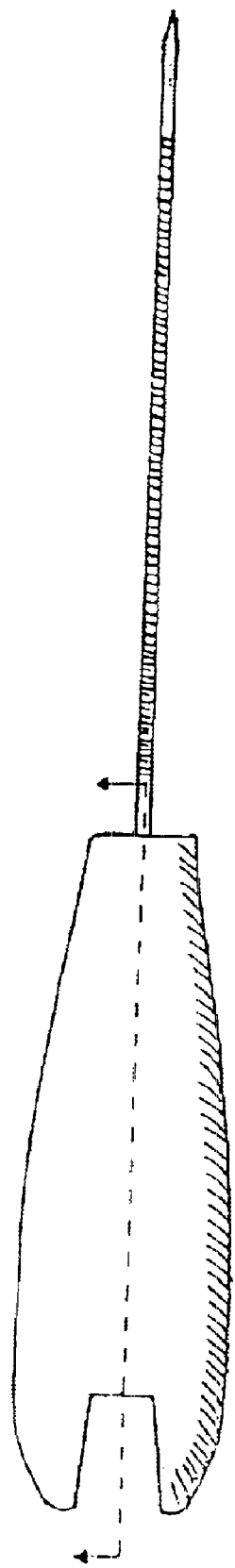
FIG. 7 Handle/Blade—top view with cutting plane line (sheet 1)
Figure 8:
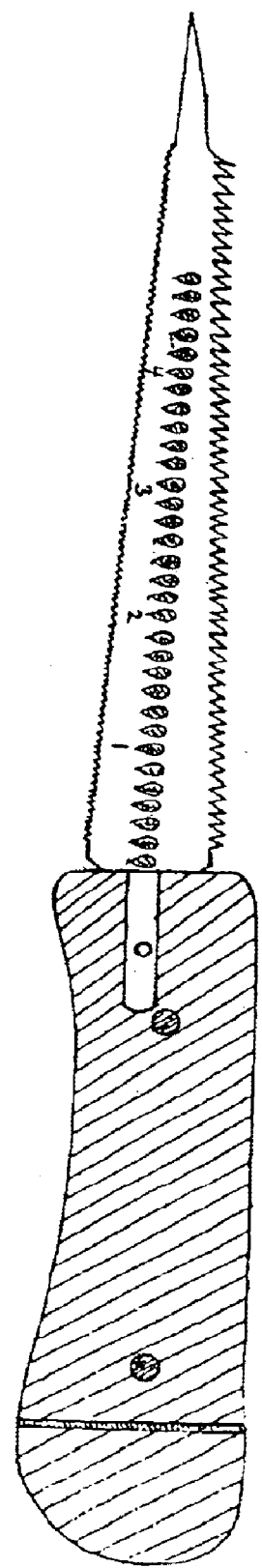
FIG. 8 Handle/Blade—side view with cross section of handle (sheet 1)

FIGS. 7 and 8 of sheet 1 contain all 3 improvements that distinguish this drywall saw from others.

My suggestion for the front page of the patent application would be views 7 and 8 on page 1.

FIG. 7 shows a top view of the entire drywall ripsaw with a cutting plane line through the length of the handle.

FIG. 8 is a side view with a cross section of the handle. The details of the handle and blade will be explained in other Figs.

Figure 6:
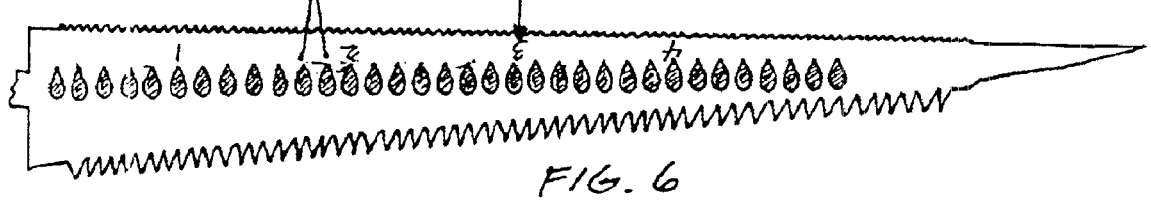
FIG. 6 Blade-side view

FIG. 6 of sheet 2 shows 2 new improvements to the existing blade: a rip guide and teeth at the top of the blade, the teeth will be explained later.

The rip guide consists of teardrop shaped holes spaced 1/8" apart at the tip of the teardrop. The numbers shown on the blade are full inch marks. There will be seven holes between each full inch mark. Fraction marks would not be needed since each hole represents 1/8". The inch marks are upside down in the drawing but will be right side up when used as described.

Holding the handle in one hand, the blade end of the handle will be placed against the edge of the drywall with the blade flat against the face of the sheet. The tip of a utility knife (held in the other hand) will be placed in the pointed area of the teardrop shaped hole with enough pressure to puncture the paper surface. With the ripsaw at a right angle to the edge, it and the knife are pulled along the sheet to make an accurate score mark anywhere from 1/4" to 4 3/4 inches.

Figure 1:
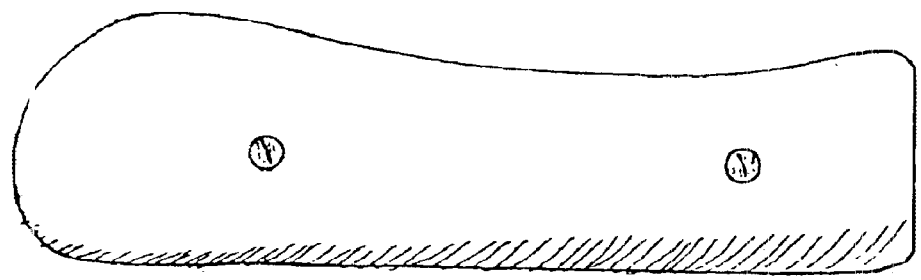
FIG. 1 Handle-side view (sheet 2)
Figure 2:
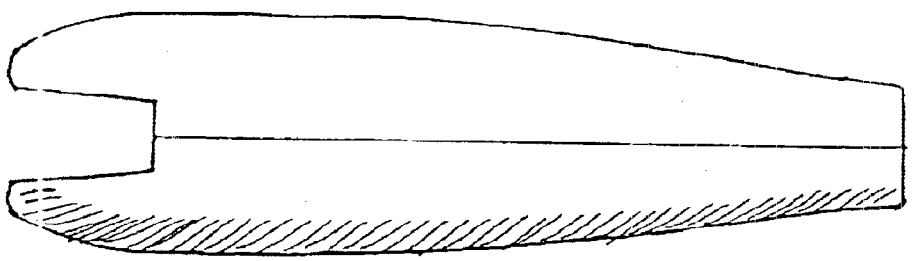
FIG. 2 Handle-top view (sheet 2)
Figure 3:
FIG. 3 Handle-bottom view (sheet 2)
Figure 4:
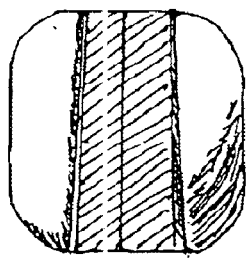
FIG. 4 Handle-end view—notched end (sheet 2)

FIGS. 2, 3 and 4 of sheet 2 show a notch at the end of the handle—this is part of the invention. The handle shape as shown in all of the drawings through unique, and has dimensions important to its intended purpose, is only for visual purposes and is not intended to be part of the invention.

This notch is used in breaking off very narrow rips of drywall after the sheet has been scored as described in FIG. 6. By placing the notch over the edge of the sheet and applying pressure with the handle and the other hand, the drywall will break with less pressure. The handle provides leverage that reduces stress on the users hand. FIG. 3 on sheet 2 shows measurements of the notch that are important to perform this function. The notch tapers from 11/16" to 1/2" which is meant to be used on 1/2" or 5/8" drywall. The best leverage is achieved with a snug fit, this is accomplished by varying the position of the handle as needed. The notch depth shown is 7/8".

A handle with a notch measuring 11/16" to 11/16" could be made for 3/4" to 1" drywall.

Figure 5:
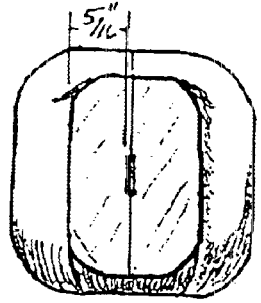
FIG. 5 Handle-end view—blade insertion end (sheet 2)

FIGS. 3 and 5 on sheet 2 show handle measurements important to the ripping function (as described in FIG. 6). The blade end of the handle should not be wider than 3/4" when viewed from the top. The blade-to-handle edge should not exceed 3/8" (5/16" is shown in FIG. 5 sheet 2). {drywall sheets are often cut to size directly from a stack of sheets leaning against a wall, framing etc., the edges do not align in this position.} With a max. of 3/8", the handle would not interfere with the sheet behind when slid along its edge.

FIG. 6 of sheet 2 shows teeth at the top of the saw blade, this is an improvement to the existing blade which only has teeth on one side of the blade. The top teeth are less aggressive. This would allow them to make finer cuts, but more importantly, this portion of the saw could be used as a "file" to quickly tough up rough cuts or breaks. The tool would be held in a position that would allow the teeth to rake across the edge as opposed to cutting into it. The fine teeth are more adapt to this function than the coarse teeth are. The fast cutting coarse teeth would remain and be used as intended.

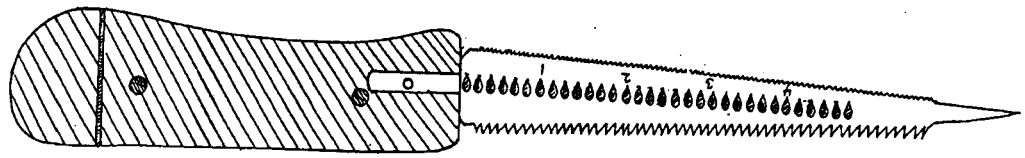

What is claimed is:

1. A handsaw used for cutting drywall comprising a blade, said blade having spaced holes along the length thereof, said blade having coarse sawing teeth at one edge and fine teeth at the other edge, said saw further comprising a handle with a tapered notch at the distal free end thereof, said handle being structured to glide along the sheet material without interference from adjacent material so that the holes in the blade may act as guides.

2. The handsaw of claim 1 wherein, said holes are equally spaced along the length of the blade, said holes being centrally located on the flat portion of the blade between the two sets of teeth.

3. The handsaw of claim 2 wherein, said holes are generally teardrop shaped so that they come to a point at one end.

4. The handsaw of claim 1 wherein, said fine teeth are a slight offset pattern used for smoothing or cutting.

5. The handsaw of claim 1 wherein, the handle has an integral tapered notch at the distal end.

6. The handsaw of claim 5 wherein, said notch is at the opposite end of the insertion point of he blade and the single notch has two purposeful tapers.

7. The handsaw of claim 1 wherein said handle includes integrally formed protrusions on either side of the blade insertion point specifically dimensioned to avoid interference with adjacent material.

* * * * *

UNITED STATES PATENT AND TRADEMARK OFFICE
CERTIFICATE OF CORRECTION

PATENT NO.   : 6,886,261 B2
DATED        : May 3, 2005
INVENTOR(S)  : Haut, Dale Steven It is certified that error appears in the above-identified patent and that said Letters Patent is hereby corrected as shown below:

The title page showing the illustrative figure should be deleted to be replaced with the attached title page.

Signed and Sealed this

Seventh Day of February, 2006

JON W. DUDAS
*Director of the United States Patent and Trademark Office*

(12) United States Patent
Haut

(10) Patent No.: US 6,886,261 B2
(45) Date of Patent: May 3, 2005

(54) DRYWALL RIPSAW

(75) Inventor: Dale Steven Haut, New Berlin, WI (US)

(73) Assignee: Dale S. Haut, New Berlin, WI (US)

(*) Notice: Subject to any disclaimer, the term of this patent is extended or adjusted under 35 U.S.C. 154(b) by 119 days.

(21) Appl. No.: 10/396,249

(22) Filed: Mar. 26, 2003

(65) Prior Publication Data
US 2004/0187320 A1 Sep. 30, 2004

(51) Int. Cl.⁷ .............................. B27B 21/00
(52) U.S. Cl. ..................... 30/502; 30/517; 30/351; 30/355
(58) Field of Search .................. 30/351, 355, 353, 30/502, 517; 7/148, 167; 83/835

(56) References Cited

U.S. PATENT DOCUMENTS

| | | | |
|---|---|---|---|
| 827,426 A | * | 7/1906 | Daniels ............... 7/148 |
| 3,837,024 A | * | 9/1974 | Saunders ............ 7/144 |
| 6,357,122 B1 | * | 3/2002 | Bachta ............... 30/355 |
| 6,401,585 B1 | * | 6/2002 | Morgan ............. 83/835 |
| 2002/0112589 A1 | * | 8/2002 | Lee et al. ........... 83/835 |

* cited by examiner

*Primary Examiner*—Douglas D Watts

(57) ABSTRACT

This invention consists of three new features which on their own or in combination, improve the usefulness of the existing drywall jab saw. The three new features are the addition of fine teeth to the top of the blade, a blade with equally spaced holes along its length which are used as a rip guide, and a notch at the end of the handle to help remove narrow rips of drywall.

7 Claims, 2 Drawing Sheets